April 30, 1963  H. W. E. VON GRODEK ETAL  3,087,329
TRACER SYSTEM FOR DETERMINING GEOMETRICAL SURFACE DIMENSIONS
Filed Dec. 10, 1959  9 Sheets-Sheet 1

INVENTORS:
HERBERT WEINGRABER
EDLER VON GRODEK
JOACHIM HASING
BY

April 30, 1963 H. W. E. VON GRODEK ETAL 3,087,329
TRACER SYSTEM FOR DETERMINING GEOMETRICAL SURFACE DIMENSIONS
Filed Dec. 10, 1959 9 Sheets-Sheet 2
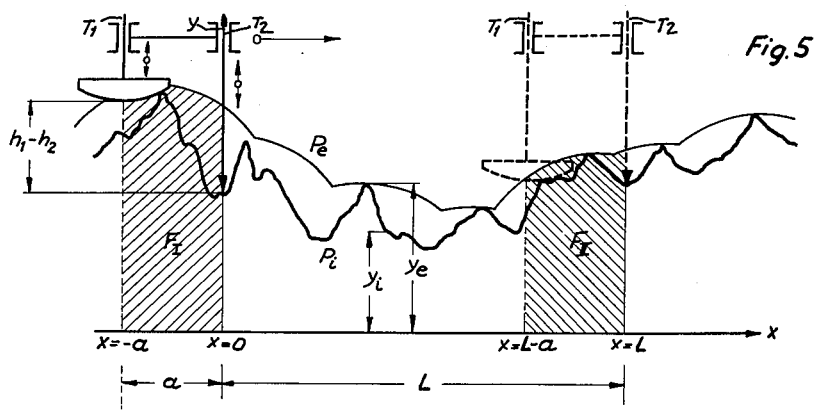
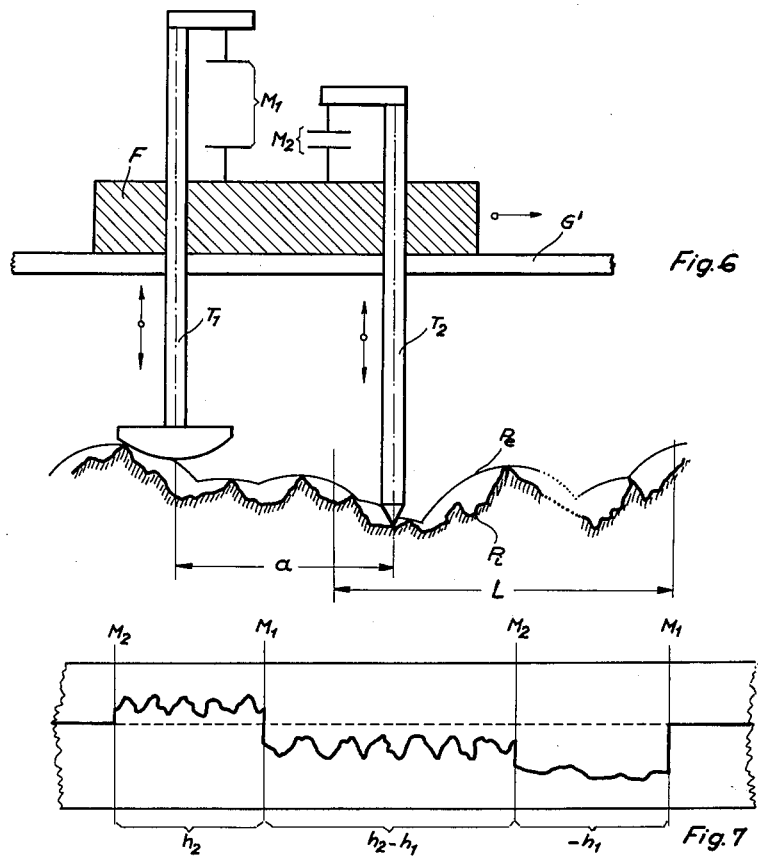
INVENTORS:
HERBERT WEINGRABER EDLER VON GRODEK
JOACHIM HÄSING
BY April 30, 1963   H. W. E. VON GRODEK ETAL   3,087,329
TRACER SYSTEM FOR DETERMINING GEOMETRICAL SURFACE DIMENSIONS
Filed Dec. 10, 1959   9 Sheets-Sheet 3

INVENTORS:
HERBERT WEINGRABER EDLER von GRODEK
JOACHIM HÄSING
BY

April 30, 1963 H. W. E. VON GRODEK ETAL 3,087,329
TRACER SYSTEM FOR DETERMINING GEOMETRICAL SURFACE DIMENSIONS
Filed Dec. 10, 1959 9 Sheets-Sheet 5

INVENTORS:
HERBERT WEINGRABER EDLER VON GROTEK
JOACHIM HÄSING
BY

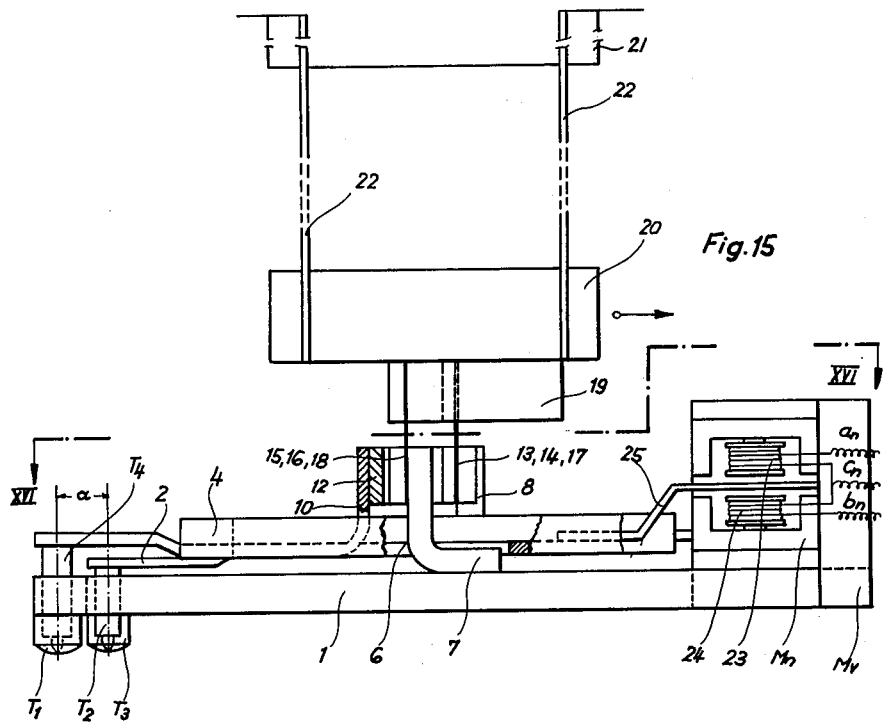
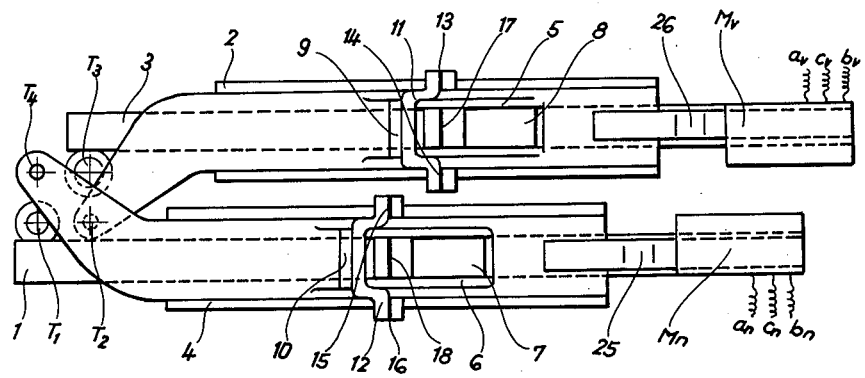

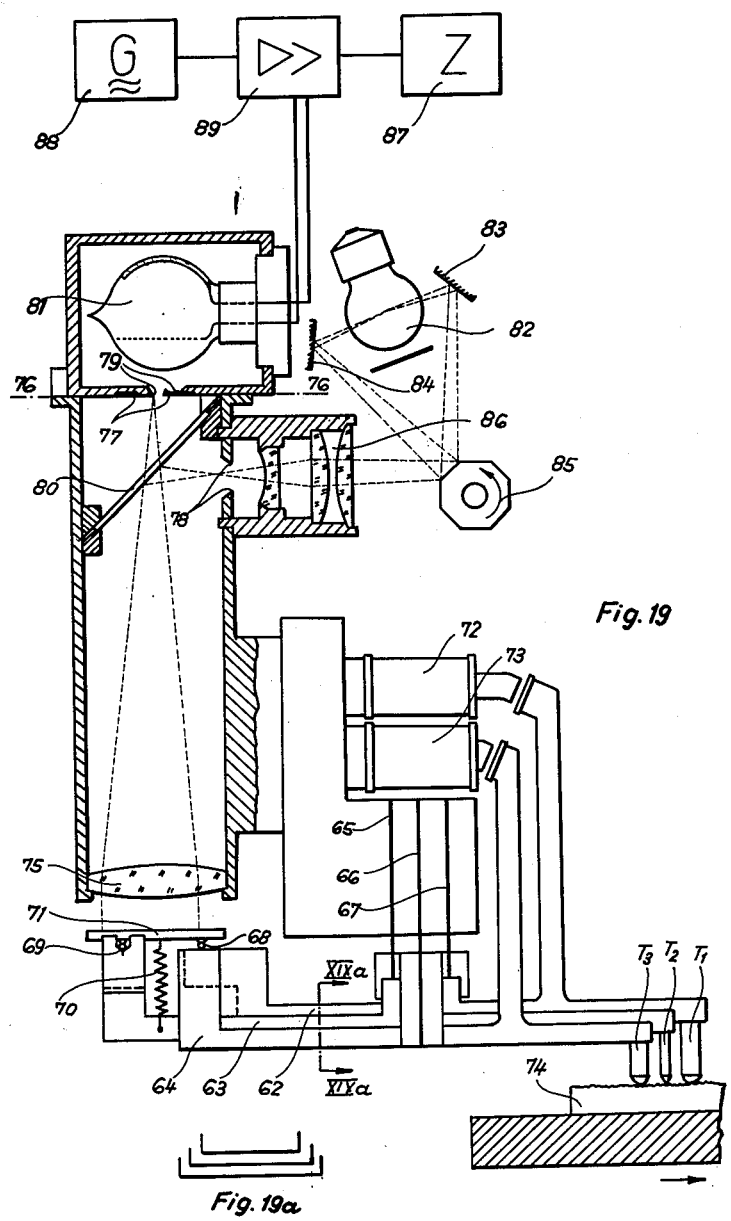

United States Patent Office
3,087,329
Patented Apr. 30, 1963

1

3,087,329
TRACER SYSTEM FOR DETERMINING GEO-
METRICAL SURFACE DIMENSIONS
Herbert Weingraber Edler von Grodek, St. Ingbert-
strasse 35, and Joachim Häsing, Am Horst Bleek 11,
both of Braunschweig, Germany
Filed Dec. 10, 1959, Ser. No. 858,794
Claims priority application Germany Dec. 13, 1958
4 Claims. (Cl. 73—105)

This invention relates in general to precision measuring instruments and to specific measuring instruments for tracing the roughness and waviness of surface areas of workpieces.

Various conventional instruments equipped with tracer means having a relatively fine point are known, wherein movement of said tracer means occurs, when they are moved over a surface area, and influences in a well known manner a suitable registering instrument, so that in most cases an enlarged and amplified picture of a section of the profile of a surface area is obtained, thus a so-called "actual profile" will be delineated. If the movement in the direction of the forward feed follows a straight line, and if the function of the aforesaid registering instrument is proportional thereto within a sufficient wide range of the axial displacement of the tracer means, the thereby obtained "actual profile" not only indicates microgeometric details, but the macrogeometric curvature of the tested surface area.

For a better understanding of the invention it is necessary to define various expressions hereinafter set forth. In order to obtain positive values of roughness and waviness of a surface, it is necessary to classify the boundaries of the roughnesse and of the waviness of a surface and to eliminate macrogeometric influences on the obtained results of the shape of the checked workpiece and of the location of the traced surface area relative to the direction of its forward feed.

Heretofore a suitable reference distance L and a reference line, so-called "mean line $L_m$," had been established. It had been a valid practice to designate the distance of the highest point $P_h$ of the "actual profile" from the mean line "smoothness height G" of the checked profile section, and the distance of the lowest point $P_t$ of the "actual profile" from the "mean line $L_m$" the "mean roughness height $R_m$" (FIG. 1).

The sum of both the values of "mean smoothness height" and "mean roughness height" was designated as "roughness height R." The known "arithmetical average roughness value $R_a$," also known as "roughness height rating" which is the mean value of all measured absolute values of all deviations of the "actual profile" from the mean line is depending upon the mean reference line.

The definition of the "smoothness height G" and of the "mean roughness height $R_m$" according to existing practice did not prove to be very practical because the values thereof depend in a higher degree on the precise establishment of the mean line than the values of the "arithmetical average roughness value $R_a$" and the "roughness height R," and are very sensitively influenced by the height of respective individual single profile points.

Therefore, the smoothness height was neglected in the industrial measuring technique, when compared with the arithmetical average roughness value $R_a$ and the "roughness height R," although the smoothness height characterizes the operational qualities of a surface better than the other values just mentioned. This becomes evident from comparing the "actual profile" of a lathe-turned surface with the "actual profile" of a corresponding cast of it. Roughness height and arithmetical average roughness are identical in both profiles but the two surfaces

2 would yield quite different results applying traces with a ball-shaped tracer point of a conventional measuring device (dial gauge), or with respect to its friction properties. This can be readily expected from the entirely different smoothness height values of the two profiles.

The present invention tends to improve the above measuring system and the measuring device for proper determining the qualities of surface areas.

It is an object of this invention to provide means affording efficacious employment of tracer means for determining geometrical surface dimensions of waviness and roughness of a workpiece area.

Another object of the present invention is to provide means enabling the measuring of surface roughness by which the influence of surface curvature is eliminated.

A further object of the invention is to provide means instrumental to the adoption of an improved and highly accurate workpiece surface roughness measuring system.

Yet another object of the invention is to provide means rendering the possibility of discriminating between waviness and roughness of surface area or areas.

Furthermore, it is an object of the present invention to provide new and improved instrument means which can be easily handled and applied to industrial practice.

Various further objects and more specific advantages will clearly appear from the detailed ensuing description taken in connection with the accompanying drawings which form part of this specification and illustrate merely by way of examples several embodiments of the device of the invention.

In the following description and in the claims parts will be identified by specific designations or terms for the sake of convenience, but such terms are intended to be as generic in their application to similar parts as the art will permit. Like reference characters denote like parts in the several figures of the drawings.

Figure 4:
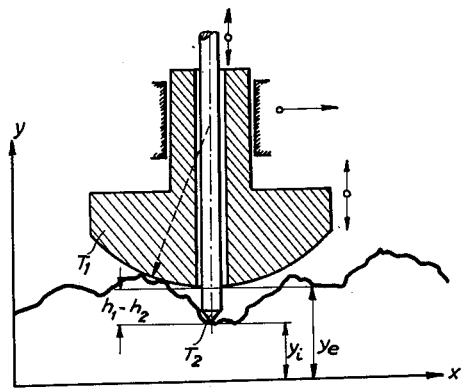
Figure 8:
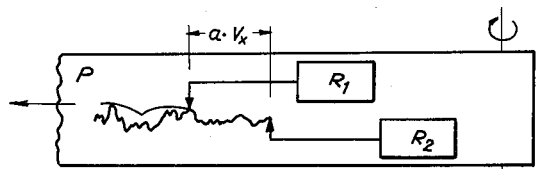
Figure 9:
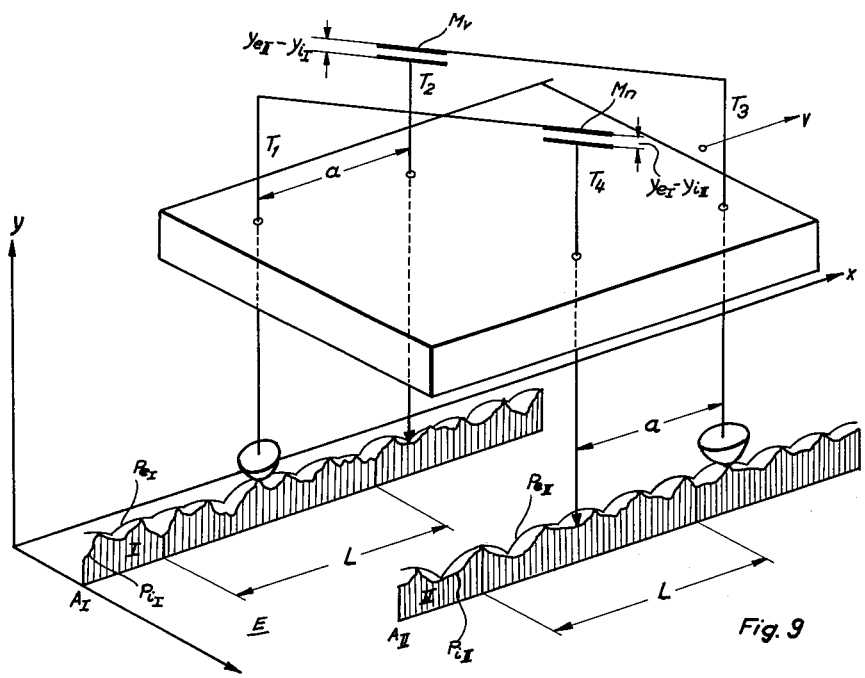
Figure 10A:
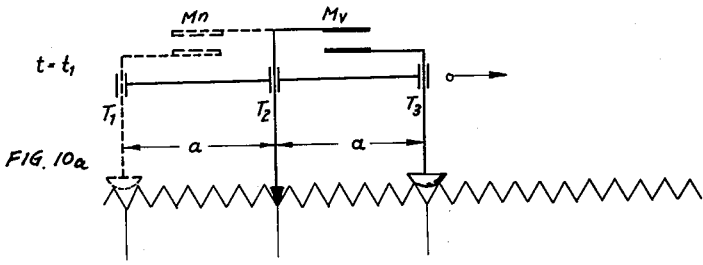
Figure 10B:
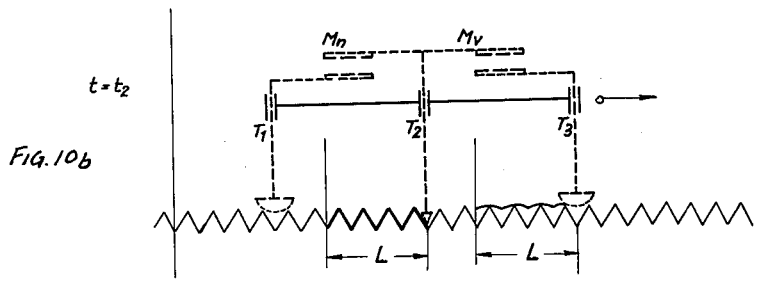
Figure 11:
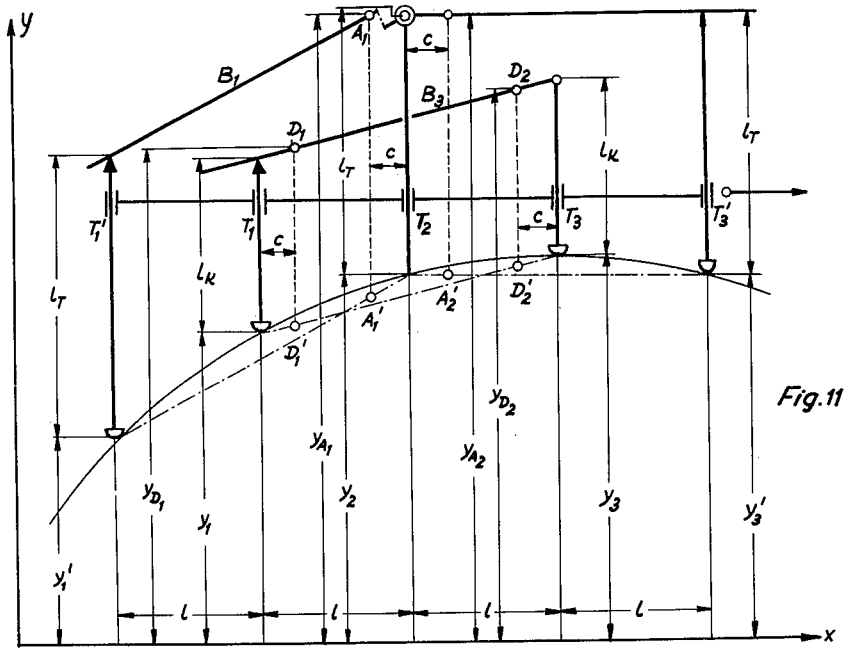
Figure 12A:
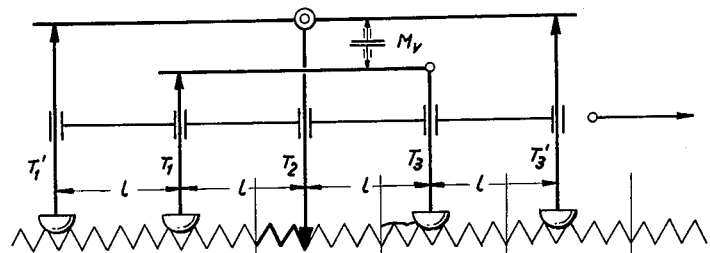
Figure 12B:
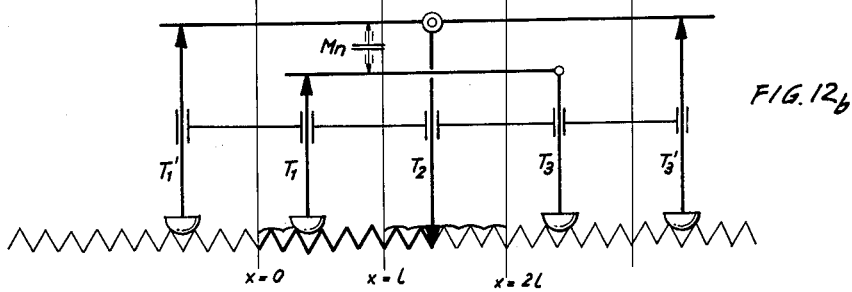
Figure 13:
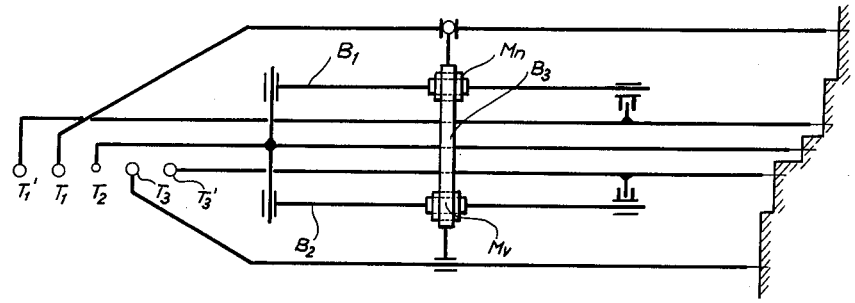
Figure 14:
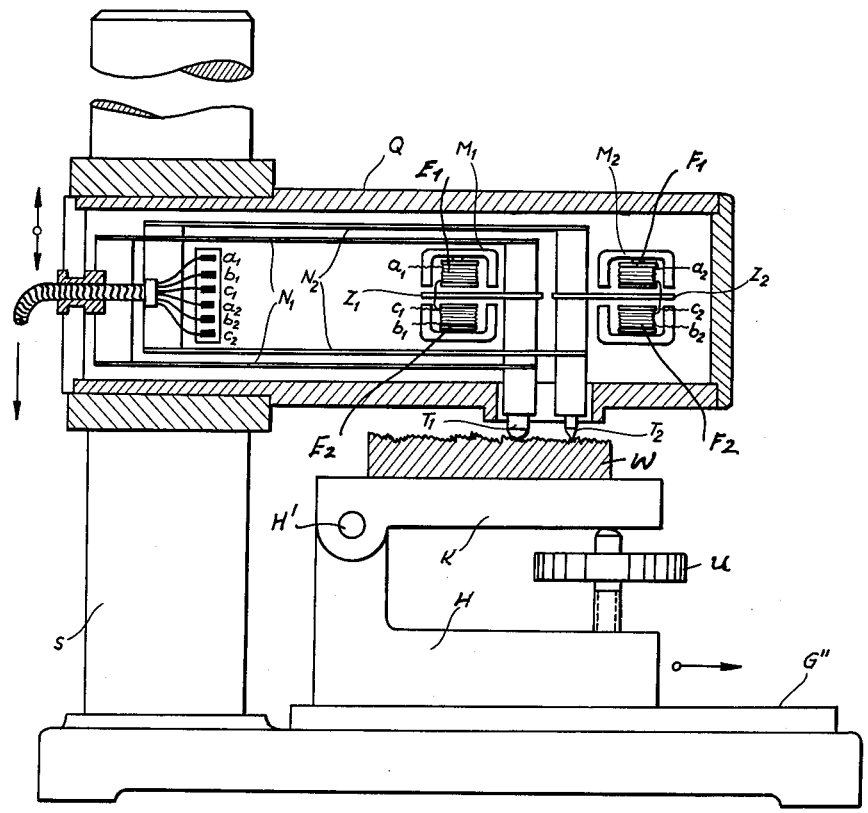
Figure 17:
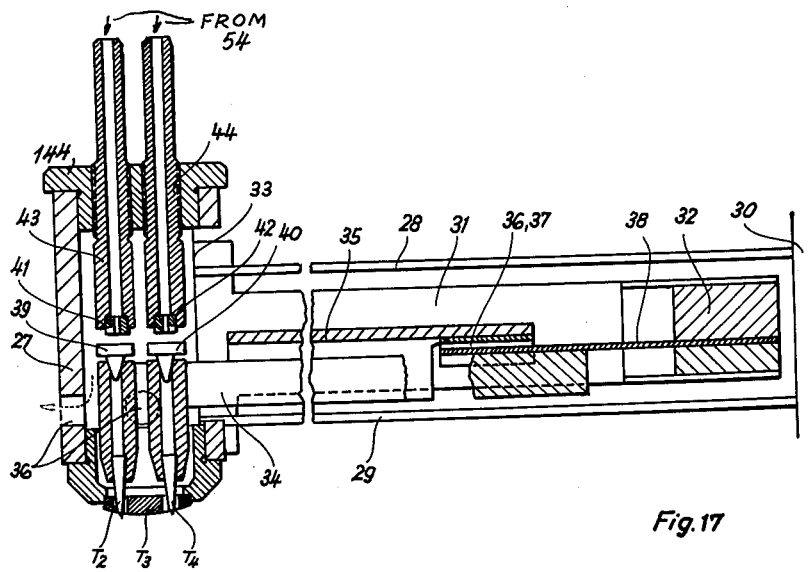
Figure 18:
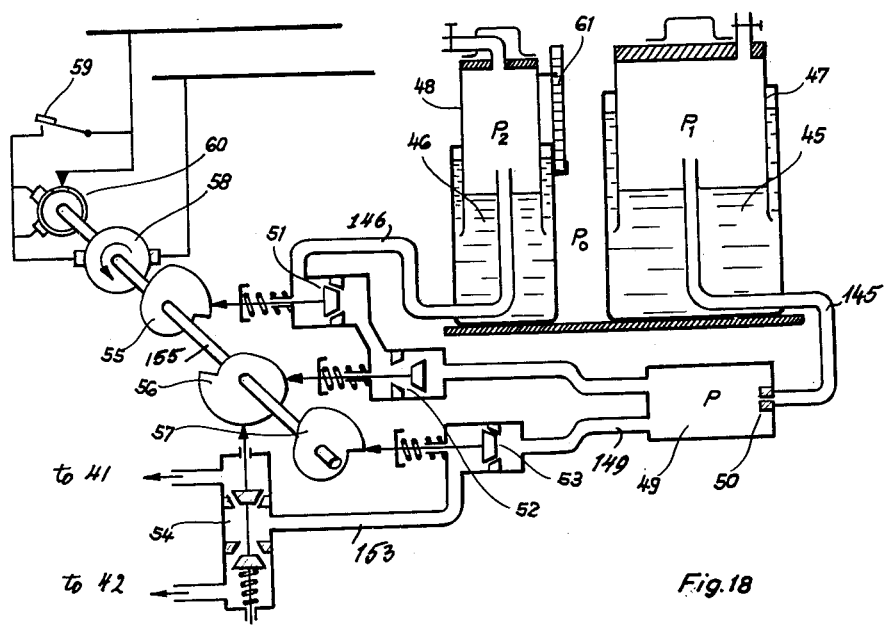

FIG. 4 demonstrates combined centralized tracer means;

FIG. 5 illustrates a tracer system having successively arranged tracers;

FIG. 6 shows schematically a tracer system equipped with a pair of successively arranged, horizontally movable tracers;

FIG. 7 shows a tracer diagram;

FIG. 8 shows another tracer diagram having two displaced follower instruments;

FIG. 9 illustrates schematically a tracer device with two pairs of tracers;

FIGS. 10a to 10b illustrate respective operational steps of a three-tracer system;

FIG. 11 is a schematic view of a five-tracer system;

FIGS. 12a and 12b indicate the measuring operation of a five-tracer system according to FIG. 11;

FIG. 13 shows the schematic arrangement of the linkage of a five-tracer system;

FIG. 14 is a side elevation, partly in section, of a surface roughness tracing instrument employing one pair of tracer means;

FIG. 15 is a schematic side view of a surface roughness tracing instrument using two pairs of tracer means;

FIG. 16 is a schematic plan view of the instrument shown in FIG. 15;

FIG. 17 is a section of a pneumatically operated tracer head;

FIG. 18 is a diagrammatic view of a pneumatic tracer device, to be arranged in conjunction with the head shown in FIG. 17;

FIG. 19 is a schematic arrangement of an optically operated workpiece surface roughness tracer device;

FIG. 19a is a schematic view of the arrangement of transmitting beams of FIG. 19.

*Basic Principle*

Recent efforts aim at registering the roughness and waviness and the macrogeometric shape deviations of workpiece surface areas by satisfactorily defined values according to uniform geometric principles. This can be achieved by a system which is different from the above described "M"-system and which may be termed "system of enveloping profile" hereinafter called "E-system." The underlying theory of this principle is as follows:

In order to obtain a "microgeometric actual profile," it is necessary to trace the surface area to be checked by a very sharp tracer point which is apt to detect all surface details. The macrogeometric deviations, however, are registered generally without recording of an "actual profile," by tracing the surface with a dial feeler gauge, a precision feeler gauge or like instrument in regard to various profile sections. Since tracers used heretofore mostly have a plane, a fulcrum-shaped or a spherically shaped tracer face having a relatively large radius curvature, the roughness cannot be registered any more. The larger the radius of the tracer means is selected, the more deviations of larger shapes are eliminated.

Figure 1:
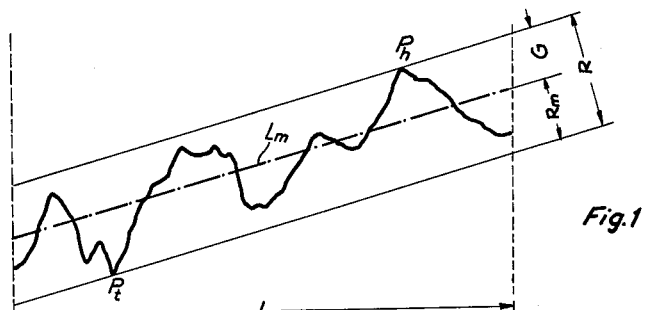
FIG. 1 illustrates generally the definitions of surface roughness.
Figure 2:
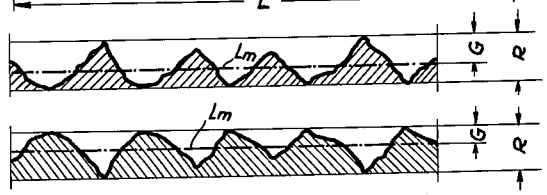
FIG. 2 shows the difference between a rough surface line and its cast counterpiece.
Figure 3:
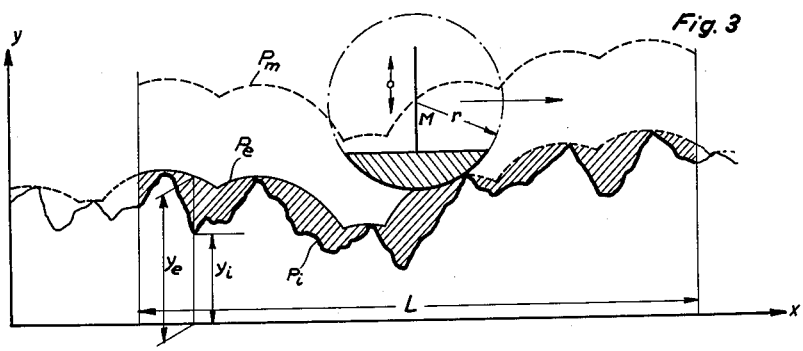
FIG. 3 illustrates the basic elements of an "enveloping profile system" according to the invention.

If the position of an axially movable tracer having a spherically shaped tracer face with the radius $r$ is defined by the lowest point (apex) of the tracer face, and if its displacement over the surface to be checked or tested is considered, a displacement curve $p_e$ composed of arcs of the radius $r$, corresponding to every actual profile $p_i$, is generated (FIG. 3). This "enveloping profile $p_e$" is the border line up to which the apex of a tracer with the radius $r$ can approach the "actual surface."

Since this curve, contrary to the heretofore used mean line, has a real meaning, the "enveloping profile" is the best means as reference line for quantitatively describing a surface by measuring values. By establishing various radii $r$, various "enveloping profiles" may be obtained which have less and less arc portions within the same reference distance L with increasing radius.

For example, an "enveloping profile" registered with a standard tracer face having a curvature radius $r_0=1$ inch, separates the roughness (deviations of the third and higher orders) from the rest of the deviations of the shape.

A tracer surface with a radius ten times larger, namely with a radius $r_f=250$ mm. results in the so-called profile of shape. The deviations included by the "enveloping profile" are designated as waviness (deviations of the second order). Then the remaining deviations of the first order only comprise macrogeometric deviations in shape.

In the E-system the smoothness height $R_p$ (designated by this symbol to differentiate it from the smoothness height G in the "M"-system (mean-line system)), is one of the most important measuring values or figures. It is defined (FIG. 3) as the mean distance of the actual profile $p_i$ from the "enveloping profile" $p_e$ within a reference distance L:

$$R_p = \frac{L}{L}\int_0^l (y_e - y_i) dx$$

A measure of value of waviness corresponding to the smoothness height $R_p$ may be defined in a similar way:

$$W_p = \frac{l}{l}\int_0^l (y_f - y_e) dx$$

wherein $y_e$ designates the ordinates of the "enveloping profile" and $y_f$ designates the ordinates of a form profile generated by a tracer having a spherically shaped face with the radius $r_f$.

To graphically evaluate $R_p$ and $W_p$ by means of an actual profile a planimeter is employed for measuring the area enclosed within the reference distance L by the designed "enveloping profile" and the "actual profile," and by the designed "enveloping profile" and the designed form profile, respectively. The method of determining the smoothness height $R_p$ is depicted according to FIG. 3 as shaded area.

However, it is required in practice to be able to determine the smoothness height like other dimensions, directly by using appropriate instruments, not only by graphical evaluation of traced "actual profiles."

The smoothness height $R_p$ according to the "E"-system may be found theoretically correct by using a tracer device similar to that shown in FIG. 4, which has two coaxially arranged tracers $T_1$ and $T_2$. While the tracer $T_2$ has a very fine point, tracer $T_1$ has a tracing face provided with a substantially larger radius of curvature $r$. Both tracers can move freely and independent from one another, in axial direction (direction of the y-coordinate). This tracer arrangement is to be displaced continuously in the direction of the x-coordinate, by suitable auxiliary means.

It would then be possible, to integrate continuously by known mechanical, electrical, optical or pneumatic means the instant distances $h_1 - h_2$ of the lowest positions of the two tracers (which coincide at any point $x$ with the differences $y_e - y_i$), and to record them after having passed over the given reference distance, as smoothness height $R_p$.

However, a device of this kind must indicate still considerable fundamental and design defects. Since the shaft of the tracer $T_2$ has to have a certain minimum thickness, and since a certain amount of tolerance has to be allowed for a friction free movement, the bore in the sphere of the tracer $T_1$ cannot be made arbitrarily small.

But precisely the areas immediately adjacent the lowest point of the sphere are especially important for correctly registering the "enveloping profile." Furthermore, there is a great danger of the device getting soiled which would cause a failure of its operation.

If one chooses an arrangement according to which the two tracer axes are displaced with respect to one another either in the direction of the forward feed (according to FIG. 5) or perpendicularly to this direction, the integral of the differences of the heights, $h_1 - h_2$, over the reference distance is no longer identical with $$\int_0^l (y_e - y_i) dx$$

The integration rather yields, if the tracer $T_1$ follows the tracer $T_2$ in the distance $a$:

$$\int_0^l (h_1 - h_2) dx = \int_0^l h_1 dx - \int_0^l h_2 dx = \int_{-a}^{l-a} y_e dx - \int_0^l y_i dx$$

$$= \int_0^l (y_e - y_i) dx + \int_{-a}^0 y_e dx - \int_{l-a}^l y_e dx$$

$$= R_p \times L + F_x - F_\pi$$

(Fig. 5)

Thus, a dimension obtained in this manner deviates more or less from the integral $R_p \times L$, especially at major deviations in shape within the tracer area.

This fault exists in all tracer systems employing two tracers, the axes of which are arranged one following the other, and by which only the differences of their vertical positions are recorded.

There are known, for example, electronic devices having two tracers, the axes of which are arranged one following the other and the tracer surfaces of which have different radii of curvature. In order to suppress the waviness of the area surfaces versus its roughness, in other words, in order to smoothen the recorded line of the actual profile, the two followers of these devices with which the tracers are equipped, are constantly electrically connected opposite one another.

Therefore, only the difference of the position of the height of the two tracers is indicated or recorded, respectively, on an indicator or instrument connected with the followers. Therefore such tracer systems are not suited for measuring the smoothness height according to the enveloping profile system. The same is true with tracer systems which are embodied in some other commercially obtainable instruments for measuring approximately the arithmetical average roughness value, whereby the tracer system is glidingly abutting against the surface of the workpiece to be checked by a ball-shaped runner and whereby the relative movement of a tracer needle or point versus this runner is recorded.

The New and Improved System

A theoretically correct and feasable measurement of the "smoothness height" according to the "E-system" can be achieved by the realization of one of the following ideas of this invention. This starts with the fact that the integral of a difference also may be obtained as the difference of two integrals, that is, that specifically the integral which is proportional to the smoothness height $R_p$, is $$\int_0^l (y_e - y_i) dx = \int_0^l y_e dx - \int_0^l y_i dx$$

According to this equation each one of the two tracers $T_1$ and $T_2$ which follow one another precisely (FIG. 6), has its own follower $M_1$ and $M_2$, respectively, which registers the position of height of its tracer relative to guide piece or means F. This guide means is moved with constant speed in a straight line perpendicularly to the direction of the movement of the tracers, along rail G' common to both tracers. It is practical to use a single guide means F for both tracers.

According to the invention the space $a$ between the two parallel tracer axes which cannot be avoided for design reasons, is eliminated for the establishment of the value of the integral by means of a switching mechanism which is operated in synchronism with the forward feed movement, as follows:

At the instant when each one of the two tracers enters the reference distance L, the corresponding follower starts operating, and is switched off as soon as its tracer leaves the reference distance. It is evident that both followers must have an equal sensitivity and must emit an equal measurement value impulse at equal distances of the pointed tracer and of the apex of the sphere of the other tracer from the common guide rail.

Each one of the two followers may be connected with an integrating recording instrument. At the end of the tracing operation the two figures recorded by the two instruments have to be deducted from one another. In many cases the difference can be established automatically without special efforts. If, for example, the axial movements of the two tracers are transformed into proportional direct-current voltages, the latter may be connected in series with different polarity and their difference which is obtained in this way introduced into the integrating indicating instrument.

The switch mechanism moving in synchronism with the tracer movement short-circuits each one of the two direct-currents as long as the corresponding tracer is outside the reference distance L in FIG. 6.

The integrating recording instrument may be replaced by a normal recording instrument which records the size of the combined voltages per time increment, a shown in FIG. 7. The evaluation of the graph by means of a planimeter likewise yields the theoretically correct smoothness height.

The same is valid corresponding for the finding of the dimension of waviness $W_p$. It only is necessary that the tracers $T_1$ and $T_2$ have the radii of curvature $r_t$ and $r_e$.

Another possibility of eliminating the influence of the dimensional distance of the tracer axes is given by using a recording system as schematically shown in FIG. 8, having two equal recording instruments $R_1$ and $R_2$ which continuously record the measurement values given by the tracers $T_1$ and $T_2$ on the same tape or chart paper, but which are staggered in the direction of the movement of said chart paper by the distance $a \cdot V_x$. Herein $a$ is the distance of the tracers from one another and $V_x$ is the ratio of the speed of the forward feed of the tracers and the chart paper. If the sensitivity and the zero point of the two recording instruments are equal, the actual and the enveloping profile is obtained on the chart paper in the correct position with respect to one another without mutually influencing their shape.

A recording of the profile of this kind has the advantage that it may be used for finding the smoothness height and equally for finding the roughness height and the arithmetical average roughness value according to the E-system. The same could be done by a single recording device which records the profile sensed by the tracers $T_1$ and $T_2$ in timed sequence, but which is shifted between the recording of the two values by the length $a \cdot V_x$ relative to the chart paper. In this case, $a$ must be equal or smaller than L.

According to the invention it is possible to operate the system without a common reference line materialized by the straight-line guiding means G in FIG. 6, if the tracer system is composed of three or more tracers. Herein it is not necessary to increase the number of followers. Thus, as shown in FIG. 9, two pairs of tracers $T_1$, $T_2$ and $T_3$, $T_4$ may be used instead of one pair of tracers $T_1$, $T_2$ having tracers with different radii of curvature. These two pairs differ from the previously described only in that the tracer having a relatively larger radius of curvature of one pair is preceding while the tracer having a relatively smaller radius of curvature of the other pair is moving ahead of the other.

All axes of the tracers are parallel to one another, and both pairs of tracers are moved simultaneously and with equal speed $v$ along the surface of a corresponding section of the profile area. Follower $M_v$ measures then the difference of height of the two front tracers $T_2$ and $T_3$ which generally are moved in two different profile areas I and II during the time interval between $t=t_1$ and $t=t_2$, that is during the time they are within the reference distance L through which they are supposed to pass.

In the same manner the other follower $M_n$ measures the difference of height of the two rear tracers $T_1$ and $T_4$ during the time interval from $t=t_3$ to $t=t_4$ during which they pass over the same distance as the two front tracers before them. The measurement taken during the two time intervals are integrated instantaneously or after a recording, as usual. The total of the two integrals is proportional to the means value of the smoothness height $R_pI$ and $R_pII$ which exists within the two reference distances.

In order to prove this, a reference plane E may be assumed to which the tracer axes are perpendicular and from which the apex of the sphere and point of the tracer of the first tracer pair has the distance $y_{eI}$ (identical with the ordinates of the enveloping and of the actual profile), while the corresponding distances for the second tracer pair are $y_{eII}$ and $y_{iII}$. On account of the aforementioned establishment concerning the arrangement and the movement of the tracer pairs, the horizontal distances of the two front tracers $T_2$ and $T_3$ from the starting points $A_I$ and $A_{II}$ of their tracing paths, respectively, are identical at a time $t$, $$x = (t - t_1)v$$

wherein $x$ = zero for $t = t_1$
$x = L$ for $t = t_2$

Correspondingly, there is for the distances of the tracers $T_1$ and $T_4$ from the starting points $A_I$ and $A_{II}$ of the same tracing paths, respectively, $$x = (t - t_3)v$$

and $$x = \text{zero for } t=t_3$$
$$x = L \text{ for } t=t_4$$

The time integral, established with the preceding follower $M_v$ and the pertaining integrating device, $$J_v = \alpha \int_{t_1}^{t_2} (y_{eII} - y_{iI}) dt$$

in which $\alpha$ represents a proportionality coefficient, may be indicated, because of $dt = dx/v$ in the form of $$J_v = \frac{\alpha}{v} \int_0^1 (y_{eII} - y_{iI}) dx$$

Likewise, the corresponding integral of the succeeding tracers is $$j_n = \alpha \int_{t_3}^{t_4} (y_{eI} - y_{iII}) dt = \frac{\alpha}{v} \int_0^1 (y_{eI} - y_{iII}) dx$$

The total of the two integrals is therefore $$J_v + J_n = \frac{\alpha}{v} \int_0^1 (y_{eI} - y_{iI}) dx + \frac{\alpha}{v} \int_0^1 (y_{eII} - y_{iII}) dx$$

$$= \frac{\alpha}{v} \cdot l \cdot (R_{pI} + R_{pII})$$

if the members belonging to the same section of profile area and tracer pair, respectively, are arranged together.

If the two tracer pairs are arranged parallel side-by-side, so that the four tracer axes form approximately a right angle square, a further advantage besides the mentioned simplification of the guiding of the tracers is obtained.

In a device according to FIG. 6 having but one pair of tracers, the two individual integrals can assume relatively large values if the reference distance leads over a convex area, although this area might be very smoothly finished and although the difference of the individual integrals becomes very small.

Since the range of linearity in the used followers, amplifiers, recording instruments etc., used with many measuring (electronic, pneumatic etc.) systems is limited, measuring the roughness of very smooth areas would have to be limited to approximately straight-line profile areas if the sensitivity of the measuring device is to be fully used. On the contrary, the described arrangement permits to check cylindrical or spherical areas which have a large curvature without running into the problem that the height differential measured by one of the followers assumes on some spot or location a value which exceeds the roughness height of the area.

In the case of a cylindrical surface area it is only necessary to arrange the center line of the cylinder approximately perpendicular to the forward feed direction of the tracers and to the axes of the said tracers. In the case of a sphere, the apex thereof must be approximately in the center between the two profile lines.

Considering now a first arrangement by which the tracer paths of both tracer pairs are in the same profile, two further tracer arrangements can be derived.

In the first one the tracer pairs are moved toward another so that the axes of two tracers, for example of $T_2$ and $T_4$, coincide. In this case, the tracer $T_2$ also can carry the function of the tracer $T_4$ (FIGS. 10a-10d). During the time interval from $t=t_1$ to $t=t_2$, the height difference between the center tracer $T_2$ and the preceding tracer $T_3$ is measured by the follower $M_v$ and transferred to the integrating or recording instrument (FIGS. 10a and 10b).

Figure 10C:
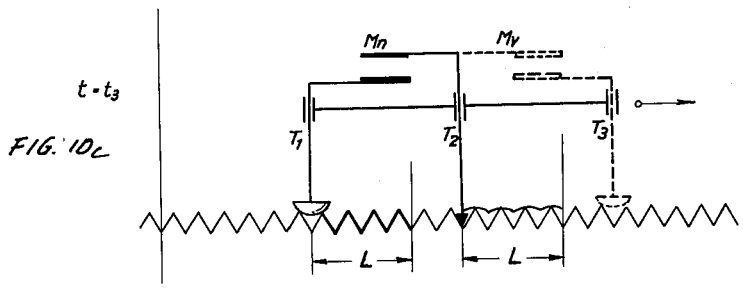
Figure 10D:
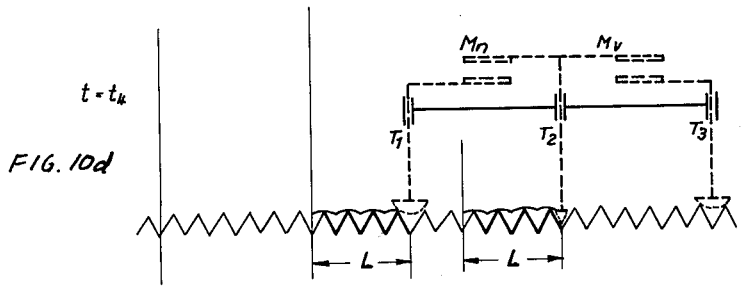

During the time interval from $t=t_3$ to $t=t_4$, the follower $M_n$ is switched on which measures in an equal way the height difference between the center tracer $T_2$ and the succeeding tracer $T_1$ and which then controls the integrating or recording instrument (FIGS. 10c and 10d). In order to avoid that the tracer paths of the tracers $T_1$ and $T_3$ overlap, the tracer distances $a$ must be established to be equal or larger than the reference distances L.

It is not absolutely necessary in the described tracer system having three tracers, that the distances between the tracers $T_1$ and $T_2$, and between $T_3$ and $T_2$ be equal. In the case of an asymmetric arrangement the follower $M_n$ has to be operated immediately after the follower $M_v$ and must be switched off when the tracer $T_1$ has approached the starting position of the tracer $T_3$.

It is not necessary to prove that the smoothness height $R_p$ also can be obtained by using this kind of arrangement of the tracers, because this specific structure does not have a particular technical significance.

The limitation to three tracers allows a simpler design of the tracer system, as it will be later shown in an example of a pneumatic-operated tracer and integration device. It is only necessary to insist upon a tracer fixture which results in a purely translational movement free of rotation, which movement does not have to follow a straight line.

A second arrangement results from the first one by adding two further tracers, one of which is positioned ahead of the three-tracer-device, while the other is located behind said device. Using such arrangement, the height differences to be measured can be held to such limits, as it is the case with the two parallel arranged pairs of tracers, that they will on no place substantially exceed the roughness height of the area, even if the profile line is macrogeometrically curved. To this extent it is necessary that the tracer axes which are sufficiently parallel to one another, succeed one another in equal increments of the distance $a=L$ and that the two preceding and the two succeeding tracers have equal radii of curvature of their spherical heads, which, however, is different from that of the center tracer.

Thus, if the center tracer has the tracer point for scanning the actual profile, the other four tracers have the radius of curvature equal $r_e$.

In this case the height differences of the individual tracers are not measured directly, in a way, which is different from the systems described above. The tracers are combined in pairs by means of bridges according to the schematic showing of FIG. 11, and the height differences of predetermined points of these bridges are measured by the followers.

As shown schematically in FIG. 11, the central tracer $T_2$ is hingedly connected or articulated to the two outermost tracers $T_1'$ and $T_3'$ by bridges $B_1$ and $B_2$, respectively, whereas the two other tracers $T_1$ and $T_3$ are connected by another bridge $B_3$, which however, has no mechanical connection with the two other bridges. (In order to maintain the parallel relationship of the tracer axes for all theoretical consideration, one of each bridge ends is to be assumed freely supported.) If the median or center tracer $T_2$ and the two outermost tracers $T_1'$ and $T_3'$ have the same length $L_T$ measured from the lowest point of the tracer to the bridge support, and if the two other tracers $T_1$ and $T_3$ have the length $L_K$, three chords can be drawn through the lowest points of the tracers having the ordinates $y_1'$, $y_1$, $y_2$, $y_3$, $y_3'$, which chords are parallel to the bridges, respectively.

On the bridges $B_1$ and $B_2'$ two points $A_1$ and $A_2$ having an equal distance $c$ from the center tracer axis, may be taken into consideration, the ordinates of which may be designated $y_{A1}$ and $y_{A2}$. Likewise, two points $D_1$ and $D_2$ are located on the bridge $B_3$ at the same distance $c$ from the corresponding tracer axes and having the ordinates $y_{D1}$ and $y_{D2}$. Below each one of these points are further points $A_1'$, $A_2'$, $D_1'$, $D_2'$ on the aforementioned chords; these points have the ordinates $y'_{A1} = y_{A1} - L_T$; $Y'_{D1} = y_{D1} - L_K$ etc. Therefore the height difference of the bridge points $A_1$ and $D_1$ is $$y_{A1} - y_{D1} = (y_{A1} - L_T) - (y_{D1} - L_K) + (L_T - L_K)$$

that is equal to the height differences of the chord points $A'_1$ and $D'_1$ below $A_1$ and $D_1$, increased by the constant amount $L_T - L_K$.

The ordinates of these chord points also may be expressed by those of the lowest points of the tracers. There is $$y'_{A1} = y_2 - \frac{c}{2L}(y_2 - y'_1) \quad (1a)$$

$$y'_{D1} = y_1 + \frac{c}{2L}(y_3 - y_1) \quad (1b)$$

and consequently $$y'_{A1} - y'_{D1} = y_2 - y_1 - \frac{c}{2L}(y_2 - y'_1 - y_3 - y_1)$$

$$= (y_2 - y_1)\left(L - \frac{c}{2L}\right) - \frac{c}{2L}(y_3 - y'_1) \quad (2a)$$

Analogously, there is $$y'_{A2} - y'_{D2} = (y_2 - y_3)\left(L - \frac{c}{2L}\right) - \frac{c}{2L}(y_1 - y'_3) \quad (2b)$$

Small portions of convex areas (cylinders, gear tooth flanks, cones, etc.) can be considered to approximate parabolic arcs. If it is assumed that the lowest points of the tracers move along a precise parabolic curve, the axis of which is parallel to the y-axis, then always is $$y_3 - y'_1 = 3(y_2 - y_1)$$

and $$y_1 - y'_3 = 3(y_2 - y_3)$$

because the general rule is valid for parabolas:

The height differences between two points on a parabola, which are equidistant from a given straight line parallel to the axis, is proportional to this distance.

In the present case the line parallel to the axis is in the center between the ordinates $y_1$ and $y_2$, and between $y_2$ and $y_3$, respectively.

Therefore it is $$Y'_{A1} - y'_{D1} = (y_2 - y_1)\left(L - \frac{c}{2L}\right)$$

Hereafter it is possible to select $c$, so that always $$y'_{A1} - y'_{D1} = \text{zero}$$

This is the case for $c = L/2$.

The height difference between the bridge points $A_1$ and $D_1$ then is equally independent from the forward feed of the tracer system and is equal to the constant value $L_T - L_K$. The same is true analogously for the bridge points $A_2$ and $D_2$.

Based upon the preceding considerations the followers in a system composed of five tracers are arranged in such way, that they measure the height differences of the chord points $A'_1$ and $D'_1$ and $A'_2$ and $D'_2$, respectively, which are characterized by $c = L/2$. These height differences originate mainly from the influence of the roughness. They exceed the range of the roughness height only so far as the enveloping profile of the surface area of the workpiece to be checked deviates from a most approximated parabola form.

It can be proven that the smoothness height $R_p$ is obtained according to the definition by such a tracer system, if the differences $y'_{A2} - y'_{D2}$ during the first half portion of the tracer path are measured and integrated. If the abscissa of the center tracer $T_2$ on its path between start and end of the total tracer distance $2L$ is denominated as the variable $x$, the total of the individual integrals over the increments from $x=$zero to $x=L$ and from $x=L$ to $x=2L$, that is:

$$J_v + J_n = \int_0^l (y'_{A2} - y'_{D2})dx + \int_0^{2l} (y'_{A1} - y'_{D1})dx$$

can be altered because of equations 2a and 2b to $$J_v + J_n = \int_0^l (y_2 - y_3)\left(L - \frac{c}{2L}\right)dx + \int_0^l \frac{c}{2L} y'_3 dx = \int_0^l \frac{c}{2L} y_1 dx$$

$$+ \int_0^{2l} (y_2 - y_1)\left(L - \frac{c}{2L}\right)dx + \int_0^{2l} \frac{c}{2L} y'_1 dx - \int_0^{2l} \frac{c}{2L} y_3 dx \quad (3)$$

Since the tracer $T'_3$ scans during the first half portion of the reference distance, FIGS. 12a and 12b, the same piece of the enveloping profile (outside the reference distance) as the succeeding tracer $T_3$ during the second half portion of the reference distance, there is:

$$\int_0^l \frac{c}{2L} y'_3 dx = \int_0^{2l} \frac{c}{2L} y_3 dx$$

The same is true for the tracers $T'_1$ and $T_1$, that is $$\int_0^l \frac{c}{2L} y_1 dx = \int_0^{2l} y'_1 dx$$

The integrals eliminate one another in Equation 3. It therefore is possible to write $$J_v + J_n = \left(L - \frac{c}{2L}\right)\left[\int_0^{2l} y_2 dx - \int_0^l y_3 dx - \int_0^{2l} y_1 dx\right] \quad (4)$$

While the center tracer $T_2$ scans the first half of its path from $x=$zero to $x=L$, the tracer $T_3$ follows over the portion of the enveloping profile between $x=L$ and $x=2L$; thus it is $$\int_0^l y_3 dx = \int_0^{2l} y_e dx$$

Over the entire tracer path, $y_2$ remains identical with $y_1$. Herewith Equation 4 eventually is transformed to $$J_v + J_n = \left(L - \frac{c}{2L}\right)\left[\int_0^{2l} y_1 dx - \int_0^{2l} y_e dx\right]$$

$$= \left(L - \frac{c}{2L}\right)(-R_p)2L = -(2L-c)R_p$$

This means that the total of the individual integrals is proportional to the smoothness height. Especially if $c = L/2$, it is $$J_v + J_n = -\frac{3}{2}L \times R_p$$

In order to achieve that the two followers register correctly the height differences of the chord points $A'_1$ and $D'_1$, and $A'_2$ and $D'_2$, respectively, it is not necessary to join the bridges $B_1$, $B_2$ and $B_3$ directly at the tracer axes. If, for example, the tracers are located on lever arms with far distant pivot points, the bridges may be journalled at appropriate points of these levers. With the proper selection of the bridge points acting on the followers, it can be achieved in many ways that the height differences of the bridge points become proportional to the corresponding chord points. According to the Equations 1a and 1b, which can be written in the form of $$y'_{A1} = \left(L - \frac{c}{2L}\right)y_2 + \frac{c}{2L}y'_1$$

$$y'_{D1} = \left(L - \frac{c}{2L}\right)y_1 + \frac{c}{2L}y_3$$

it is only necessary that the transmission factors, with which the vertical movements of the tracers are transferred to the bridge points, are proportional to the coefficients $$\left(L - \frac{c}{2L}\right) \text{ and } \frac{c}{2L}$$

Especially if $$c\frac{c}{2L} = \frac{L}{2}$$

these transmission factors are for every two tracers acting on one bridge point in the proportion of 3:1.

In the arrangement according to the schematical diagram shown in FIG. 13, this is performed by having the bridges $B_1$ and $B_2$ resting on the lever of the tracer $T_2$ at ¾ and on tracers $T'_1$ and $T'_3$ at ¼ of the length of the lever (taken from the pivot point of the lever), and having their centers acting on the followers $M_n$ and $M_v$. The bridge $B_3$ is supported on the center of the levers of the tracers $T_1$ and $T_2$, while their points acting on the followers (which points are in this case identical with the centers of the followers) are arranged at ¼ and ¾ of the length of the bridge.

One of many possible embodiments of the system having two tracers according to FIG. 6 is shown in a simplified way in FIG. 14. The tracer $T_1$ having a spherical tracer head and the tracer $T_2$ having a sharp point are suspended from leaf spring pairs $N_1$ and $N_2$, respectively, in the housing Q, adjusting means not being shown in the drawing. By the use of leaf spring in pairs, the two tracers only can move in the direction of their axes. Flat steel tongues or blades $Z_1$ and $Z_2$ are connected with the tracers, respectively, which steel blades may alter their position between the coils $F_1$, $F_2$ and $E_1$, $E_2$ of the emitters (or followers) $M_1$, $M_2$, which operate according to the principle of the law of induction, corresponding to the position of height of the corresponding tracers. The wires $a_1$, $b_1$, $c_1$ and $a_2$, $b_2$, $c_2$ of the coils $F_1$, $F_2$ and $E_1$, $E_2$ lead to a timer element (not shown in the drawing).

This timer element switches the emitter—or follower—$M_1$ and $M_2$ in successive order to the same parts of an electric bridge as soon as the respective tracer $T_1$ or $T_2$ enters the reference distance, and switches said emitters—or followers—$M_1$ and $M_2$ off correspondingly when the tracers $T_1$ and $T_2$ leave the reference distance.

The housing Q carrying the tracer system is vertically displaceable on column or stand S so that the tracers may be properly adjusted relative to the position of followers $M_1$ and $M_2$. The horizontal forward feed is in this example not accomplished by the tracers $T_1$ and $T_2$ but by the workpiece W to be tested. This workpiece W is placed on a table K which is attached to a guide or support H which can be moved on a base G'' with a constant speed in the direction of the arrow. The base G'' is precisely perpendicular to the axes of the tracers $T_1$ and $T_2$. The table K is pivotally mounted on a hinge H' and is supported by and adjustment screw U so that the surface of the workpiece W to be checked may be levelled approximately parallel to the base G''. The electric drive for the support H is not shown in the drawing.

An embodiment of the system having four tracers according to FIG. 9 is shown in FIG. 15 in side view and in FIG. 16 in plan view.

The two tracers $T_1$ and $T_3$ having spherical tracer heads are mounted on levers 1 and 3, the pointed tracers $T_2$ and $T_4$ on levers 2 and 4, respectively. The levers 2 and 4, made of sheet metal, have openings 5 and 6, respectively, through which angle bars 7 and 8, which are attached to levers 1 and 3, respectively, point upwardly. Brace bars or traverses 11 and 12 are attached to struck and bent parts 9 and 10 of the levers 2 and 4, respectively. Leaf springs 13 to 18 are clamped to the ends of the brace bars 11 and 12 and to the angle bars 7 and 8 which leaf springs are held by a common support 19 in such way, that the levers 2 and 3 are staggered with respect to levers 1 and 4 by the distance $a$ of the tracers $T_1$ and $T_2$ seen in the direction of the forward feed.

Thus, all four levers, 1, 2, 3 and 4 can swing freely and independently from another in the vertical planes established by the tracer axes and in the direction of the forward feed. The support 19 is firmly attached to the swinging member 20, which is suspended by a pair of leaf springs 22 from the housing 21 and which can be moved parallel to itself in the direction of the arrow by drive elements (not shown), so that a translational forward feed motion can be applied to the entire tracer system. The followers $M_v$ and $M_n$ are arranged on the rear ends of the levers 1 and 3.

The flat iron blade 25 which is attached to the lever 4 protrudes into the air gap between the induction coils 23 and 24 of the follower $M_n$. In the same manner blade 26 which is attached to the lever 2 protrudes between the coils of the follower $M_v$ (which coils are not shown in the drawing). If the coordinated tracers $T_1$ and $T_4$ or $T_2$ and $T_3$ change their position of height by the same amount during the forward feed movement, the position of the flat iron blades in the air gaps of the corresponding pairs of coils remains unaltered. Thus, the followers only register changes of the height differences between coordinated tracers and emit measuring impulses proportional thereto. In the same way as demonstrated in the first example, a timer switches each one of the followers to an electric bridge for the time period during which corresponding tracers are within the reference distance.

In FIG. 17, a system having three tracers combined with pneumatic followers is shown, which operates according to the system explained in FIG. 10. However, while in FIG. 10 one pointed tracer is combined with two tracers having spherical heads, one tracer having a spherical head $T_3$ operates according to this example in combination with two pointed tracers $T_2$ and $T_4$.

This tracer combination can be derived from the system with four tracers according to FIG. 9, if all four tracers are moved in the same track and if $T_3$ therein assumes the function of $T_1$. The tracer $T_3$, consisting of a ruby or of a sapphire having bores for the tracers $T_2$ and $T_4$, is rigidly attached to the tube-shaped tracer head 27. This head can move freely in a vertical direction by way of two pairs of leaf springs 28 and 29, which are fixed on its sides, and which are firmly clamped to the housing 30 of the forward feed device. Furthermore, the tracer head 27 has on each side a bar 31, to the end of which a spring clamp piece 32 is adjustably attached.

The levers 34 and 35 protrude through a gap or opening 33 of the tracer head 27 into its interior. Lever 35 which consists of a bent piece of sheet metal and which envelops lever 34 from above, as well as lever 34, supports on one of their ends tracers $T_4$ and $T_2$, respectively. On the other end, lever 35 is connected by two leaf springs 36 and 37 with the spring clamp 32, while lever 34 is correspondingly connected by means of a wider leaf spring 38 with the spring clamp 32. The three leaf springs 36, 37 and 38 are arranged in one plane and are arranged in such way that both levers have the same length.

This arrangement permits the tracers $T_2$ and $T_4$ to move freely and independently from one another relative to the tracer $T_3$ whereby the measuring value of each individual tracer depends only on the tension or preload of the respective leaf spring. The two tracers $T_2$ and $T_4$ have inserts 39 and 40, respectively. The upper faces of the inserts 39 and 40 are arranged perpendicularly to the tracer axes.

Opposite these faces are the calibrated metering nozzles 41 and 42 which are fixed to the pipes 43 and 44, respectively. The pipes 43 and 44 are adjustably located in the cover 144 of the tracer head 27. By these means the distance between the metering nozzles 41 and 42 and the inserts 39 and 40 below same can be adjusted in such way, that the same amount of air flows out during the same time interval, when all three tracers assume the same position of their lowest points and when the air pressure on the nozzles is equal.

With respect to the zero position of the tracers $T_2$ and $T_4$ relative to the tracer $T_3$, the distances between the inserts 39 and 40 and the nozzles 41 and 42 vary continuously when rough surfaces are traced, and the averages of these distances are slightly larger than in said zero position.

If the air flow is directed through the metering nozzle 42 during the first part of the forward feed movement and through the metering nozzle 41 during the second part of said forward feed movement, the total air volume which flowed out during the total forward feed movement is linear proportional to the smoothness height $R_p$ of the traced or scanned surface, provided the pressure before the metering nozzles remains practically constant.

The part of the air volume proportional to the smoothness depth (height) can be directly determined by a gas metering device according to FIG. 18. Due to the different weights and diameters of the telescoping covers 47 and 48, two different, but at a given time constant pressures $p_1$ and $p_2$ are present in the two gas containers 45 and 46. The pressure differences between $p_1$, $p_2$ and the pressure $p_0$ of the surrounding atmosphere may be in the proportion 2:1. These two containers 45 and 46 are connected by pipe lines 145 and 146 with a chamber 49, these connections being established from the larger container 45 having the higher pressure $p_1$ through a nozzle or jet 50 and from the smaller container 46 through valves 51 and 52.

Valve 51 is closed at the beginning of the cycle, valve 52 is open. The jet 50 may have an effective discharge opening of approximately the same size as that of the metering nozzles 41 and 42 of FIG. 17 in the zero position of the tracers, while the valves 51 and 52 do not have a marked flow resistance. The chamber 49 is connected by a pipe line 149 with the valve 53 which is closed at the beginning of the cycle, and by a pipe line 153 with the reversing valve 54, and thus with the two metering nozzles 41 and 42.

The valves are operated by the cams 55, 56, 57 mounted on a shaft 155 which is rotated by a motor 58 after shortly pressing a starter button 59. When the shaft 155 arrives again at its starting position, it stops because the current is interrupted on the slipring 60. Shortly after the start, valve 53 is opened, whereby the pressure within the chamber 49 levels off to assume a value $p$ which is approximately halfway between $p_1$ and $p_2$. By a proper setting of the pressure $p_1$, for example by varying the weight of the telescoping cover 47, it can be arranged that the pressure $p$ in the chamber 49 at the zero position of the tracers is equal and identical to the pressure $p_2$ in the smaller container 46. In this case, the air volume in the container 46 remains unchanged when valve 51 is opened.

But if the actually operative tracer is lowered below its zero position due to roughness or unevenness of the traced surface, the air flowing additionally from the corresponding metering nozzle 41 or 42 is supplied solely from container 46 since the pressure difference $p_1-p_2$ between the larger container 45 and the chamber 49 is not changed. For the same reason, because of a diminished air flow from the metering nozzles 41 and 42, a corresponding air volume flows into container 46 when the corresponding tracer is lifted beyond its zero position.

The air volume which had flown at the end of the entire tracer operation up to the closing of valve 52 from container 46, can be measured on a scale 61, and is a dimension for the integral $$J=\int_0^1 (y_3-y_2)dx + \int_0^1 (y_3-y_4)dx$$

and thus at the same time for the smoothness height $R_p$.

The third example of a practical embodiment of the invention is shown in FIG. 19. It comprises means for establishing the follower values by optical-photographical means, and operates after the system with three tracers, as shown in FIG. 10. The tracers $T_1$, $T_2$, $T_3$ are mounted on balancing levers 62, 63, 64. The center lever 63 is connected by way of a leaf spring 65, and the two other leaves 62 and 64 by way of leaf springs 66 and 67 with the stand or the housing of the device (not shown).

The ends of the levers 62, 63, 64 which are opposite the tracers, support a mirror 71 freely borne by two parallel wires 68 and 69 and held in place by a spring 70. Two solenoids 72 and 73 attract lever 64 during the first half of the scanning time and lever 62 during the second half of the scanning time, so that always only one of the two levers supports the wire 68 of the mirror 71, influencing the position of said mirror 71.

By properly selecting the length of the levers 62, 63, 64 and the position of the leaf springs 65, 66, 67 the wires 68 and 69 change their height differences with respect to one another by the same increments as the tracers $T_3$, $T_2$ and $T_1$, $T_2$, respectively, when they pass over the reference distance on the surface of the workpiece 74 to be checked.

The mirror 71 changes its direction in proportion to the height difference of the wires relative to the optical axis of the lens 75 arranged above said mirror 71. The real image 77 of the slot 78 is in the focal plane of said lens 75 and moves according to changes in the direction of the mirror 71. Furthermore, there is a slit diaphragm 79, the borders of which are parallel to those of the slot image 77, without covering same.

If the lowest positions of the tracers (zero position) are at an equal height, the slit diaphragm 79 should be fixed within its plane in such way, that one of its borders covers most of the width of the slot image 77. The deeper the tracer point $T_2$ is lowered below the level of the tracers $T_3$ and $T_1$, respectively, the wider becomes the uncovered part of the slot image.

Correspondingly a light beam becomes more intense which is emitted from the evenly illuminated slot 78, passes through the semi-transparent or opaque plane glass 80 and strikes after passing twice through the lens 75 a photocell 81 located above the slit diaphragm 79. The time integral of this light emission, diminished by a constant value resulting from the zero position, therefore could be used as a measure of the smoothness height $R_p$ of the scanned surface.

Instead of this integration of light emission, which calls for a good constancy of the light source, of the sensitivity of the photocell and of the auxiliary electronic means, the method of integration schematically shown in FIG. 19 is recommended. The straight-line filament of a light bulb 82 is depicted by way of one of the fixedly arranged mirrors 83 and 84, of the octagonal rotating mirror 85 and by the lens system 86 in very small scale in the plane of the slot 78.

Together with the slot 78, this reduced image of said filament once more is depicted in the focal plane 76. If the mirror 85 rotates with approximately 5 revolutions per second, the image of the filament passes with constant velocity 80 times per second across the width of the slot image 77. It is, however, every time only "visible" for the photocell 81 for the time it appears in the uncovered part of the width of the slot image 77.

The individual exposure times of the photocell 81 which are a linear function of the height differences of two cooperating tracers can be counted by an electronic counter 87 which counts the impulses of a pulse generator 88 operating with approximately 10 kilocycles. To this extent it only is necessary to put an amplifier 89 after the photocell 81, which amplifier 89 is arranged between pulse generator and counter, so that the photocell 81 blocks said amplifier 89 during the time interval when it does not receive a light beam from the filament of the light bulb 82.

While the invention has been described and illustrated with respect to certain particular preferred embodiments or examples which give satisfactory results, it will be understood by those skilled in the art after understanding the principle of the invention, that various other changes and modifications may be made without departing from the spirit and scope of the invention and it is intended therefore in the appended claims to cover all such changes and modifications.

Having thus described the invention, what is claimed as new and desired to be secured by Letters Patent, is:

1. A tracer system for determining geometrical surface dimensions of waviness and roughness of a workpiece surface area comprising two pair of tracer means, the axes of all the individual tracer means being parallel to one another, each pair of the tracer means consisting of two elongated tracer means including one having an end of relatively large radius and one having an end of relatively small radius, both pair of tracer means being moved simultaneously at equal speed along the workpiece surface, the individual tracer means of one pair of tracer means following a common tracer path and the individual tracer means of the other pair of tracer means following another common tracer path, the said common tracer paths of the two pairs of tracer means being parallel, and each individual tracer means being axially movable independently from one another toward and from said workpiece surface area and arranged in such manner that one of said two pair of tracer means has the elongated tracer means with the small radius in a leading position while the other of the two pair of tracer means has the elongated tracer means with the larger radius in a leading position, and means connected to each pair of tracer means to record a measuring value only when the trailing tracer of the pair has passed through the tracing path of the leading tracer means of the pair.

2. A tracer system for determining geometrical surface dimensions of waviness and roughness of a workpiece surface area comprising three tracer means arranged in a straight line, two tracer means being provided with ends of the same radius and the third tracer means being provided with an end of a different radius than the radius of the two tracer means, one of said two tracer means located before and the other tracer means located after the third tracer means, said three tracer means being axially movable independently of one another toward and from the workpiece surface, said three tracer means being moved simultaneously at equal speed along the workpiece surface, and means connected to the three tracer means to record a measuring value for each of said tracer means only when they pass through a preselected tracing path.

3. A tracer system for determining geometrical surface dimensions of waviness and roughness of a workpiece surface area as defined in claim 2 comprising two further tracer means along the same straight line of the said three tracer means, one of which is positioned ahead of the three tracer means and the other one of which being positioned behind the three tracer means, all five tracer means being equal distance from one another, three bridges, two of which bridges hingedly connecting the respective two further tracing means to the intermediate tracing means of the three tracing means and the third bridge hingedly connecting the two first mentioned tracer means together, whereby the height of certain points on the third bridge can be registered relative to certain points on the first and second bridges.

4. A tracer system for determining geometrical surface dimensions of waviness and roughness of a workpiece surface area as defined in claim 3 wherein said points on the first and second bridges are arranged so that the axial displacement of the two further end tracer means are transferred to their respective bridge points with two different transmission factors carrying the ratio of three to one (3 to 1).

References Cited in the file of this patent

UNITED STATES PATENTS

| | | |
|---|---|---|
| 2,396,935 | Walstrom | Mar. 19, 1946 |
| 2,398,562 | Russell | Apr. 16, 1946 |
| 2,460,726 | Arndt | Feb. 1, 1949 |